United States Patent [19]

F'Geppert

[11] 4,044,620
[45] Aug. 30, 1977

[54] TRANSMISSION

[75] Inventor: Erwin F'Geppert, Novi, Mich.

[73] Assignee: The United States of America as represented by the Secretary of the Army, Washington, D.C.

[21] Appl. No.: 639,529

[22] Filed: Dec. 10, 1975

[51] Int. Cl.² .................. F16H 15/00; F16H 55/34; F16D 13/22
[52] U.S. Cl. .................................... 74/190; 74/216; 74/796; 192/30 R; 192/65
[58] Field of Search ............... 74/690, 691, 772, 793, 74/773, 796, 798, 190, 194, 198, 206; 192/27, 30 R, 105 BA, 105 CS, 74, 65; 152/415

[56] References Cited

U.S. PATENT DOCUMENTS

| 2,164,504 | 7/1939 | Dodge | 74/690 |
| 2,956,656 | 10/1960 | Becksted | 192/30 R |
| 3,245,286 | 4/1966 | Hewko | 74/798 |
| 3,414,099 | 12/1968 | Davis | 192/65 |
| 3,532,140 | 10/1970 | Hoffman | 152/415 |

FOREIGN PATENT DOCUMENTS

| 1,054,648 | 2/1954 | France | 74/190 |

Primary Examiner—Samuel Scott
Assistant Examiner—Lance W. Chandler
Attorney, Agent, or Firm—Peter A. Taucher; John E. McRae; Nathan Edelberg

[57] ABSTRACT

A variable speed ratio transmission wherein conventional pneumatic tires are caused to orbit around an annular track to transmit motive forces from the input mechanism to the output mechanism. The tire planes are adjustable relative to the track plane to provide varying roll-skid engagement relationships, and different speed ratios.

5 Claims, 4 Drawing Figures

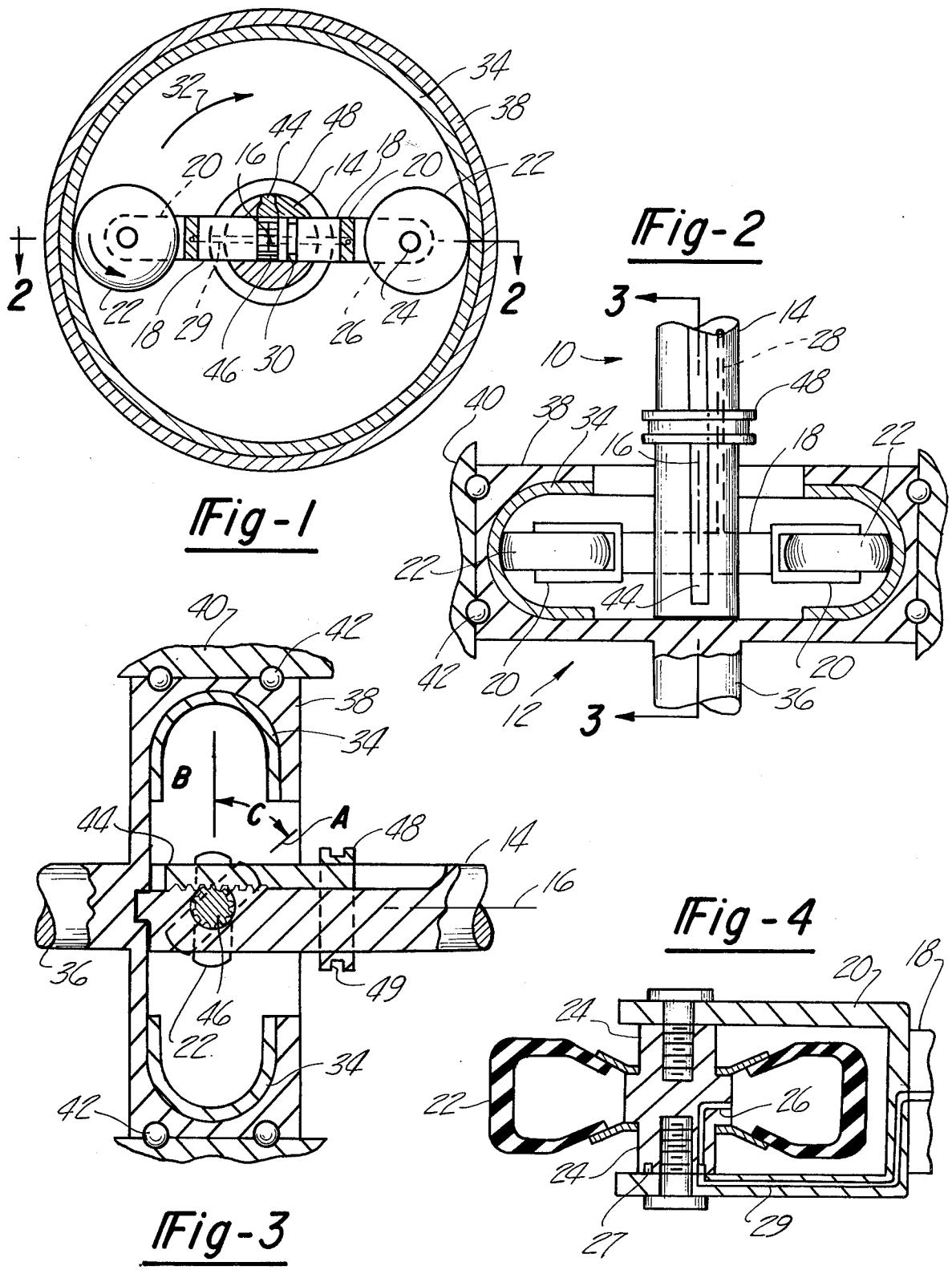

TRANSMISSION

The invention described herein may be manufactured, used, and licensed by or for the Government for governmental purposes without payment to me of any roalty thereon.

BACKGROUND AND SUMMARY OF THE INVENTION

The invention contemplates a transmission wherein the input shaft carries a transversely extending cross heat that rotatably mounts two small pneumatic tires located outboard from the shaft axis. The output shaft carries an endless annular track that is engaged by the tread areas of the tires. As the input shaft rotates the tires are caused to orbit around the track surface. The tires transmit drag forces to the track to thereby input rotational motion to the output mechanism.

The speed ratio may be changed by adjusting the cross head around its axis. Such adjustment changes the rotational plane of the tires relative to the rotational plane of the track so that the tires have different rolling and skidding actions on the track surface.

THE DRAWINGS

FIG. 1 is a sectional view taken through one embodiment of the invention.

FIG. 2 is a sectional view taken on line 2—2 in FIG. 1.

FIG. 3 is a sectional view taken on line 3—3 in FIG. 2.

FIG. 4 is a fragmentary sectional view of a tire used in the FIG. 1 structure.

The transmission shown in FIGS. 1 through 3 comprises an input (drive) mechanism 10 and an output (driven) mechanism 12. Input mechanism 10 includes a shaft 14 suitably mounted in non-illustrated bearings for rotary motion around its central longitudinal axis 16. Exending transversely through shaft 14 is a cross head 18 that is equipped at its opposite ends with U-shaped yokes 20. A pneumatic tire 22 is disposed within each yoke for free rotational movement around the axis defined by tire axle 24.

During operation shaft 14 rotates around axis 16 to move cross head 18 in the direction denoted by arrow 32 (FIG. 1). Tires 22 roll and/or skid on the surface of an endless annular track 34 that forms part of the output mechanism 12.

As seen in FIG. 2, output mechanism 12 includes a shaft 36 extending axially from an annular casing 38 that it suitably journaled for rotation within stationary housing 40, as by means of anti-friction bearings 42. The aforementioned track 34 is affixed to casing 38 to form a single rotary mechanism. Preferably, although not necessarily, the track and casing are formed of different materials in accordance with their different functions. The casing is preferably formed of steel for straight and adequate containment of the annular track against the effects of centrifugal force and high tire pressure forces. The track material is preferably selected on the basis of wear and a relatively high coefficient of friction. Suitably track materials are believed to be concrete to asbestos-phenolic composites of the type uses for automotive brake linings. Steel or other metal could be conceivably used for the track, providing the exposed track surfaces was first roughened, as by etching, embossing or abraiding.

As shown in FIGS. 1 and 2, tires 22 have their rotational plaens coincident with the mid plane of annular track 34. The tires therefore roll easily on the track surface as depicted by arrow 35 in FIG 1; minimal thrust force is transmitted from each tire to the track surface so that the output mechanism remains motionless or moves at a relatively slow speed, depending on the output load.

FIG. 3 illustrates a mechanism for adjusting the tires to positions wherein their rotational plane A is acutely angled relative to the track plane B. The adjusting mechanism comprises a toothed rack 44 longitudinally slidable in a slot in shaft 14, and a gear section 46 cut in the surface of cross head 18. An externally grooved collar 48 is attached to rack 44 to produce rack motion while shaft 14 is rotating. Conventional fork mechanism (not shown) is positioned with the fork ends disposed in groove 49 to move the collar along the surface of shaft 14.

When rack 44 causes cross head 18 to be incrementally rotated through a variable angle C the tire rotational plane is acutely angled relative to track plane B; the tires will then tend to have a skid type engagement with the track 34 surface. While angle C is still relatively small the tire track engagement will be primarily rolling, with some slight skidding. As angle C is increased the tire skidding will predominate. Increased skidding will cause the tires to deliver increased tractive force to the output mechanism, thus increasing the speed ratio (e.g. up to 1-1 when the tire rotational plane has a skew angle C of 90° relative to the track plane).

It will be seen from FIGS. 2 and 3 that track 34 has a semi-circular cross section. The imaginary diameter measured across this cross section is approximately the same as the diameter of each tire 22. Therefore, when the tire rotational plane A is angled at 90° relative to track plane B the tires completely fill the track space. Each tire will then engage the track for one half its circumferential distance. Since the tires are then completely incapable of rolling on the track surface the tires will have maximum tractive effect.

The tires will at some point completely lock onto track 34, with zero slip. The lock-up action may occur either before or when angle C has a value of 90°. Some factors influencing the lock-up angle are believed to be the tire diameter, tire width, tire tread pattern track 34 surface roughness, tire inflation pressure, input torque, and track cross section. A semi-circular track cross section, as shown in FIG. 2, will produce a fully locked-up condition after a comparatively small angular adjustment C. A flat or elliptical cross section track 34 surface would provide lock-up conditions only after the tire rotational plane has been adjusted through a much greater angle C; under some conditions and loadings the flat track surface might be unable to produce a fully locked-up condition. The track surface cross section is preferably selected on a trial-error basis.

It may be desirable to have a capability for adjusting or varying the inflation pressure of the tires after installation of the transmission in the power plant. FIGS. 1, 2 and 4 schematically illustrate a passage system for flowing air into or out of each tire carcass. As shown, the passage system comprises a passage 26 and annular groove 27 extending within axle 24, and a passage 29 extending through yoke 20 and cross head 18. A remote air pressure source and vent mechanism (not shown) may be selectively connected to a passage 28 in shaft 14;

groove 30 in cross head 18 connects passage 28 with passage 29 in any adjusted position of the cross head.

ADVANTAGES OF THE INVENTION

One advantage of the illustrated mechanism is its ability to achieve a full lock-up (zero slip) condition; such a condition is not attainable with conventional fluid type transmissions. Another advantage is the relatively high torque-transmitting capacity obtained from the ability of the tire elastomer to conform to the track surface; the tire pessure enables the tire tread area to firmly grip the track surface even as the tire rotational plane is adjusted (angle C in FIG. 3). One other possible advantage of the illustrated construction is long wear and service life; tire technology is such that present day tires have relatively good wearing qualities compared to other rigid friction materials such as steel, etc. For equivalent contact pressure the rubber-concrete engagement herein envisioned probably has a longer wear life than other rigid materials, such as steel against steel; additionally the elastomer requires no liquid lubrication such as is necessary with certain wet clutch systems.

It should also be noted that a pneumatic tire has shock-absorption capabilities that are helpful in minimizing the transmission of vibrational forces from the engine to the power take-off device, or vice versa. The tire also tends to be self-adjusting the compensate for tread wear and/or track wear. Further compensation may be achieved by flowing air into or out of the tire carcass, either under manual control or automatically in response to some danger signal such as low power output. It is conceivable that tire pressure could be varied to control the tire contact pressure and tractive force without need for the adjustment rack structure 44.

Various modifications may be made while employing the inventive concept set forth in the appended claims.

It wish it to be understood that I do not desire to be limited to the exact details of construction shown and described for obvious modifications will occur to a person skilled in the art.

I claim:

1. A variable speed ratio transmission comprising a rotary input mechanism and a rotary output mechanism coaxially aligned for rotation on a single transmission axis;

said output mechanism including an endless annular track centered on the transmission axis; said input mechanism including a rotary shaft on the transmission axis, a cross head extending transverse to the shaft, and a pneumatic tire rotatably mounted at each end of the cross head for planetary orbiting movement around the track surface; the tires and track constituting the drive connected between the input and output mechanisms; said input mechanism futher comprising means carried by the input shaft for rotatably adjusting the cross head around its axis, whereby the tire rotational planes are enabled to take varying angles relative to the track plane.

2. The transmission of claim 1: said track having a semi-circular cross section; the tires and track cross section having the same diameter, whereby the tires are caused to be non-movably locked to the track surface when the tire rotatational plane is normal to the track plane.

3. The transmission of claim 1: the cross head including a yoke at each of its ends; each tire having an axle journaled in the yoke so that the tire rotates on an axis normal to the general direction taken by the cross head.

4. The transmission of claim 1: said cross head adjusting means being constructed so that the tire rotation planes can be adjusted while the transmission is transmitting power from the input mechanism to the output mechanism.

5. The transmission of claim 4: said cross head adjusting means comprising a gear carried by the cross head and a gear-engaged rack carried by the input shaft for movement therealong.

* * * * *